Figure 1:
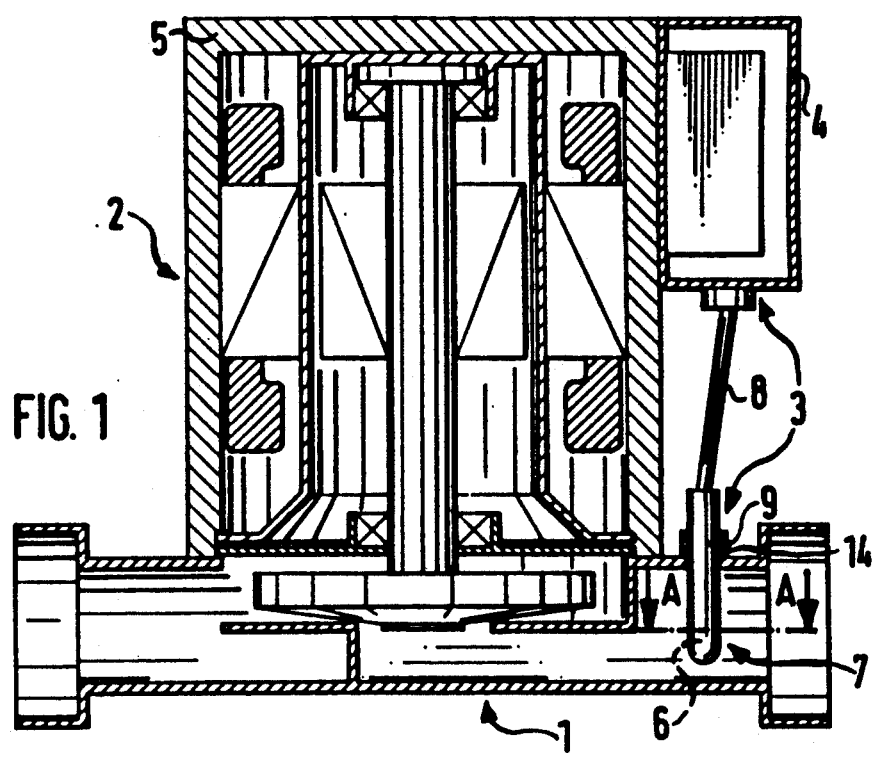

United States Patent [19]
Jensen et al.

[11] Patent Number: 5,202,596
[45] Date of Patent: Apr. 13, 1993

[54] ELECTRIC MOTOR

[75] Inventors: Niels D. Jensen; Thomas Blad, both of Bjerringbro; Bjarne D. Pedersen, Hammel, all of Denmark

[73] Assignee: Grundfos International a/s, Bjerringbro, Denmark

[21] Appl. No.: 698,590

[22] Filed: May 10, 1991

[30] Foreign Application Priority Data

May 10, 1990 [DE] Fed. Rep. of Germany ........ 4014918

[51] Int. Cl.$^5$ ...................... H02K 5/18; H02K 11/00; H02K 1/00; H02K 7/20
[52] U.S. Cl. .................................. 310/64; 310/68 R; 174/16.3; 361/388; 361/398
[58] Field of Search .............. 310/52, 64, 68 R, 68 D, 310/160, 89; 361/387, 388, 398; 174/16.3, 50.51, 50.54

[56] References Cited

U.S. PATENT DOCUMENTS

| | | | |
|---|---|---|---|
| 3,665,269 | 5/1972 | Wright et al. | 317/258 |
| 3,884,293 | 5/1975 | Pessolano et al. | 165/51 |
| 4,420,652 | 12/1983 | Ikeno | 174/52 |
| 4,668,898 | 5/1987 | Harms et al. | 310/68 R |
| 4,712,030 | 12/1987 | Lakin et al. | 310/89 |
| 4,718,163 | 1/1988 | Berland et al. | 361/382 |
| 4,908,757 | 3/1990 | Jensen et al. | 310/54 |
| 4,992,687 | 2/1991 | Nel | 310/68 D |
| 5,006,744 | 4/1991 | Archer et al. | 310/89 |
| 5,095,404 | 3/1992 | Chao | 361/385 |

FOREIGN PATENT DOCUMENTS

| | | | |
|---|---|---|---|
| 3642724 | 6/1988 | Fed. Rep. of Germany | 310/60 R |
| 0165941 | 9/1984 | Japan | 310/64 |

Primary Examiner—Steven L. Stephan
Assistant Examiner—C. LaBalle
Attorney, Agent, or Firm—Dvorak and Traub

[57] ABSTRACT

The electric motor is provided with an attached frequency converter for rotational speed control. The frequency converter consists of a power supply and other electronic elements. While these electronic elements are arranged as a constructive unit with the electric motor, the power supply is arranged as an individual constructive unit separated from the motor, in the form of a module. The module can be made separately from the motor and electrically connected to the motor constructive unit through a connective cable. The use of the motor is no longer dependent on cooling radiators, required for the cooling of the power supply, as only the module is now fitted with cooling radiators.

7 Claims, 1 Drawing Sheet

ELECTRIC MOTOR

The invention relates to an electric motor provided with an attached frequency converter for rotational speed control, whereby the frequency converter consists of a power supply and other electronic elements, for example, input circuit, intermediate circuit, forming a constructive unit with the motor housing.

Electric motors of this kind are used in numerous technical applications for driving working machines, for example, pumps for liquids or gases. Different operational conditions require the use of motors with different characteristics, for example, regarding performance, constructive dimensions and rotational speed. For example, for operating centrifugal pumps, it is desirable to select motors with rotational speeds as high as possible because of the physical conditions specific for centrifugal pumps in order to obtain high values of manometric pressure and productive capacity. It is known that, in order to control the rotational speed at given frequency of the power line, a static frequency converter should be used with the electric motor. Resulting from this, the motor can be adjusted without significant losses to the corresponding operational conditions of the system.

Due to the progressive developments in the field of electronics, it became possible to miniaturize the frequency converters as a result of using integrated circuits and elements in such a way that they can be arranged on the motor or respectively form a constructive unit together with the motor. Such combined arrangement of the motor and the frequency converter is known, for example, from DE-OS 36 42 724.

It is known that such arrangements in which the frequency converter and the motor are constructively connected to each other provide numerous advantages, especially reducing the manufacturing cost. However, problems often arise regarding the cooling of the frequency converter. The required cooling surface is limited by the size of the housing of the frequency converter or respectively the motor depends in a considerable extent upon the cooling radiators available. For example, with cooling using liquid, a comparably small surface is required, whereas with cooling using air, a considerably larger cooling surface is required which could be at least ten times larger. Under practical conditions, this results in the fact that, with the same motor characteristics, different constructive forms are necessary in order to provide the required cooling of the frequency converter. Such a variety of designs necessary in the process beginning with the manufacturing and ending up with the storage is comparably expensive.

Based on an electric motor, in which the frequency converter forms a constructive unit, the object of the invention is to build an electric motor, the constructive unit of which can be used independently of the available cooling radiator and which can be fitted to a corresponding cooling radiator in a simple and cost favorable way.

In accordance with the invention, this task is solved by having a part of the frequency converter, in which the heat losses are the largest, arranged as a separate module, whereby, the mentioned module is connected to the motor constructive unit through an external connecting cable.

Because of this arrangement, in accordance with the invention, it is now not necessary to fit the motor constructive unit to the respectively available cooling radiator in order to provide for the cooling of the frequency converter constructive unit, but only the module should be fitted. The invention makes it possible to use the module which is connected to the motor constructive unit through a suitable external connecting cable. It is understood that, based upon the arrangement in accordance with the invention, a great number of designs of the motor constructive units which were required up to now for the cooling of the frequency converter power supply can now be reduced to the minimum. Moreover, parts of the electronic elements in the frequency converter, for example, the control circuit, can be integrated in the module if this is considered practical based upon some reasons. More advantageous arrangements of the invention are characterized by features described in the claims. They also result from the practical example described below based upon the drawing.

It is advantageous to select a module from a number of different modules which are fitted with usually available cooling radiators, taking into consideration the cooling surface, so that, depending upon the application, only suitable power supply modules will be selected in order to adjust the electric motor constructive unit to the corresponding operational conditions.

It is practical to design the power supply module in such a way that its housing is hermetically and pressure sealed from the outside, so that the use of this module does not depend upon local conditions, for example, dusty atmosphere, weather conditions and similar factors. Such an arrangement becomes especially necessary when the module must be cooled by using a liquid. In order to provide for the possibilities of a quick and simple connection to the module correspondingly adjusted to the application conditions, it is appropriate to foresee a separable connection, so that the constructive units which should be correspondingly adjusted to each other can be connected to a power supply in a simple way, for example, using a plug-type connector without requiring special knowledge and skills. It is advantageous when such plug-type connector is arranged both on the motor and on the power supply module side since then only the connecting cable should be adjusted to the space arrangement of both constructive units. Under such conditions, the connecting cable can be pre-manufactured in certain lengths, so that the individual adjustment is necessary only in exceptional cases.

In order to minimize the multiplicity of modules of different types necessary for corresponding applications, it is appropriate to design the power supply module in such a way that its effective cooling surface can be changed without constructive alterations of the module, for example, by putting on a finned cooling body. This can be achieved, for example, by using a cylindrical body, on which a heat conductive cooling body can be put, which should also preferably be shrink-fitted. Such shrink-fitted contact provides the greatest advantage for such tasks as the surface pressure between the cooling body and the housing increases, at a growing temperature difference, which also results in more effective heat conductivity between both constructive elements.

In order to provide for a good heat conductivity between the electronic elements of the power supply and the module housing, it is appropriate that the chassis on which the electronic elements of the power supply are arranged are made of a heat conductive material, for example, copper, and this chassis is mounted in the module housing. Such an arrangement is also advantageous regarding the electrical safety as both chassis and housing can be grounded together.

In order to provide for excellent heat transfer between the electronic elements of the power supply on the one hand, and the module housing, on the other hand, it is appropriate that the module housing be filled with heat conductive paste or heat conductive liquid, which surrounds the electronic element of the power supply everywhere and transfers the generated heat losses to the housing.

It is appropriate to have a threaded end on the module housing so that it can be threadedly attached, for example, in a hole of a constructive pipe or in a wall furnished with a thread.

As it was already pointed out, the module housing should be arranged correspondingly to the available cooling radiator. For a module housing in the form of a pipe sleeve with an outside diameter in the range between 6 and 30 mm, at the present time, the following surface ratios are considered appropriate (the given numbers relate to the ratio of the internal housing surface which is formed, for example, by cooling fins to the internal surface of the housing:

1. At cooling based on free convection, the surface ratio from 8 to 30 is appropriate.
2. At forced cooling based on the gas flow, the surface ratio in the range between 3 and 10 is beneficial.
3. At cooling based upon the flow of liquid, the surface ratio of the sleeve is a little over 1.

Figure 2:
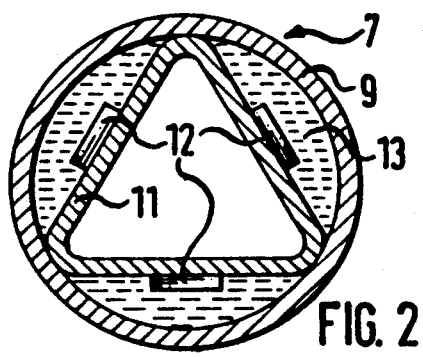
Figure 3:
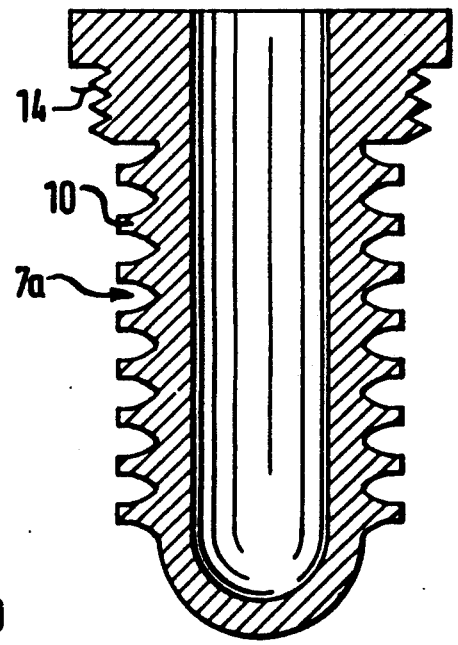
Figure 4:
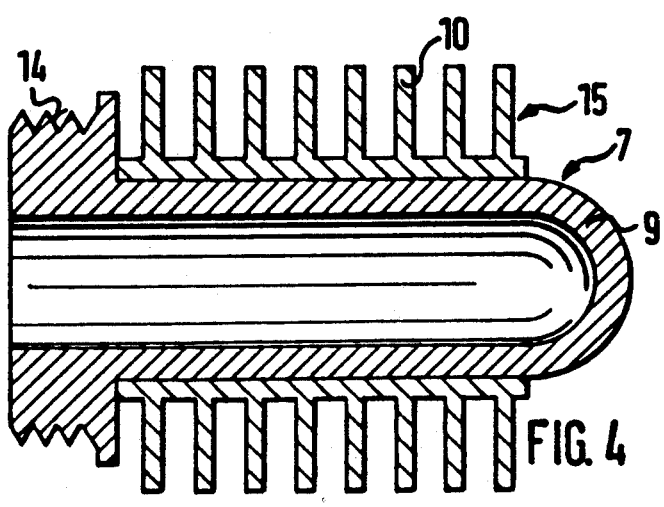

The invention is described more in detail in the following text based on practical examples presented in the Figures, which show:

FIG. 1: a schematic view of a longitudinal section through a centrifugal pump driven by an electric motor;

FIG. 2: a section along the A—A line in FIG. 1 in a magnified presentation (cross-section through the module);

FIG. 3: a longitudinal section through a module that is cooled using forced gas flow;

FIG. 4: a longitudinal section through the module put on the cooling body for convectional cooling.

FIG. 1 shows a centrifugal pump, which is used, for example, in heating systems as a circulation pump. The centrifugal pump 1 is driven by an electric motor 2 which is powered by a frequency converter 3. The frequency converter 3 consists of an input circuit, intermediate circuit, control circuit, as well as power circuit already known. The input circuit, intermediate circuit and control circuit are arranged in a terminal box 4 associated with a motor housing 5 of the electric motor 2, and forms a constructive unit with the electric motor 2. The power supply circuit is arranged as a power block 6 in a separate module 7. In the case of necessity, the control circuit can also be arranged together with the power supply circuit in the module 7 instead of the terminal box 4. The module 7 is connected via a connecting cable 8 with the remaining electronic elements of the frequency converter 3 in the terminal box 4.

The power block 6 is arranged in a housing 9 shaped as a hollow cylinder which is hermetically and pressure sealed from the outside. As can be seen from FIG. 1, the housing 9 of the module 7 projects into a feed pipe of the pump 1, so that a stream of the pumped medium passes about the module and provides the necessary cooling. The heat developed within the power block 6 is dissipated by the pumped medium. Since the heat transfer between the housing 9 and the fluid pumped medium is rather high, a fin arrangement on the housing 9 can be employed. This arrangement has an advantage in that waste heat of the power supply 6 is removed by the pumped medium and, therefore, can be effectively used as a heating source.

The connecting cable 8 is connected, both to the module 7 and the motor 2, via a plug connector, so that the electric connection between the power block 6 and the other electronic elements of the frequency converter 3 can be arranged without any problems.

Instead of the module 7, as shown in FIG. 1, being cooled by a liquid, a module 7a, as shown in FIG. 3, can be used. This module 7a is furnished with cooling fins 10 on the outside when, for example, the power block 6 is air cooled. The power supply module 7 shown in FIG. 1 can be enlarged regarding its cooling surface by providing a cylindrical cooling body 15 as is shown in FIG. 4. It is advantageous when such body 15 is shrink-fitted on the housing 9.

FIG. 2 shows the inner construction of the module 7. Inside of the cylindrical housing 9, a chassis 11 is mounted and which is made of copper or of a comparable material which easily conducts heat. This chassis has a three-sided profile having rounded corners mating with the inner radius of the housing 9. In the chassis 11, the electronic elements of the power block are heat-transfer arranged with electronic elements of a power supply 12 as shown in FIG. 2. The chassis 11, adjacent its corners, is fitted in good contact with the radius of the housing 9 and, therefore, is heat conductive to the housing 9. The space between the chassis 11, the electronic elements of the power supply 12, and the housing 9 is filled with a heat-conducting medium, for example, with heat-conducting paste 13, in order to increase the heat transfer between the electronic elements of the power supply 12 and the housing 9.

The housing 9 has on its outer side, a thread 14 with which it is fastened within the threaded hole in the delivery pipe line.

What is claimed is:

1. An electric motor comprising:
   a frequency converter for rotational speed control of said motor, said frequency connecter having an input circuit, an intermediate circuit, a control circuit and a power supply circuit,
   a sealed modular housing remotely disposed and thermally independent from said electric motor,
   a replaceable, enlarged surface area heat transfer body in heat transferring connection with said module housing,
   said power supply being disposed within said module housing,
   a terminal box disposed on a motor housing of said motor, said input circuit, said intermediate circuit, and said control circuit being disposed within said terminal box, and
   a connecting cable connecting said power supply with said terminal box and said motor, whereby heat generated by said power supply is dissipated at a chosen location.

2. An electric motor according to claim 1, wherein said replaceable heat transfer body is shrink-fit onto said module housing.

3. An electric motor according to claim 1, wherein said replaceable heat transfer body is finned.

4. An electric motor according to claim 1, wherein said power supply has a copper chassis.

5. An electric motor according to claim 1, wherein electric elements of said power supply are surrounded by a heat-conducting fluid.

6. An electric motor according to claim 1, further comprising an external thread on said module housing.

7. An electric motor according to claim 1, wherein said module housing is disposed in a flow of fluid being pumped by a pump driven by said motor.

* * * * *